United States Patent [19]

Yomogizawa et al.

[11] Patent Number: 5,172,151
[45] Date of Patent: Dec. 15, 1992

[54] IMAGE PICKUP APPARATUS

[75] Inventors: Shinya Yomogizawa; Akihiro Nami; Hideo Ikari; Makoto Miyawaki; Chikara Aoshima, all of Kanagawa; Takashi Ikeda, Tokyo, all of Japan

[73] Assignee: Canon Kabushiki Kaisha, Tokyo, Japan

[21] Appl. No.: 754,168

[22] Filed: Sep. 3, 1991

Related U.S. Application Data

[63] Continuation of Ser. No. 511,990, Apr. 19, 1990, which is a continuation of Ser. No. 277,535, Nov. 28, 1988, which is a continuation of Ser. No. 37,463, Apr. 13, 1987.

[51] Int. Cl.$^5$ .......................................... G03B 13/02
[52] U.S. Cl. .................................. 354/219; 354/432
[58] Field of Search ............... 354/408, 471, 472, 465, 354/432, 219, 224, 225; 352/136, 140, 92

[56] References Cited

U.S. PATENT DOCUMENTS

| | | | |
|---|---|---|---|
| 3,883,883 | 5/1975 | Sano et al. | 352/140 |
| 4,303,322 | 12/1981 | Someya | 354/432 |
| 4,372,657 | 2/1983 | Iwata et al. | 354/471 |
| 4,553,170 | 11/1985 | Aoki et al. | 352/136 |
| 4,566,773 | 1/1986 | Kaneda | 354/408 |
| 4,571,627 | 2/1986 | Stempeck | 354/219 |
| 4,574,319 | 3/1986 | Konishi | 352/92 |

Primary Examiner—Russell E. Adams
Attorney, Agent, or Firm—Robin, Blecker, Daley & Driscoll

[57] ABSTRACT

An image pickup apparatus in which an image of an object is converted by an image sensor into video signals to be supplied to a monitor is disclosed wherein a control circuit controls the substantial exposure of the image sensor and the monitor is inhibited from displaying the video signals when the exposure is not adequately controlled by the control circuit.

32 Claims, 12 Drawing Sheets

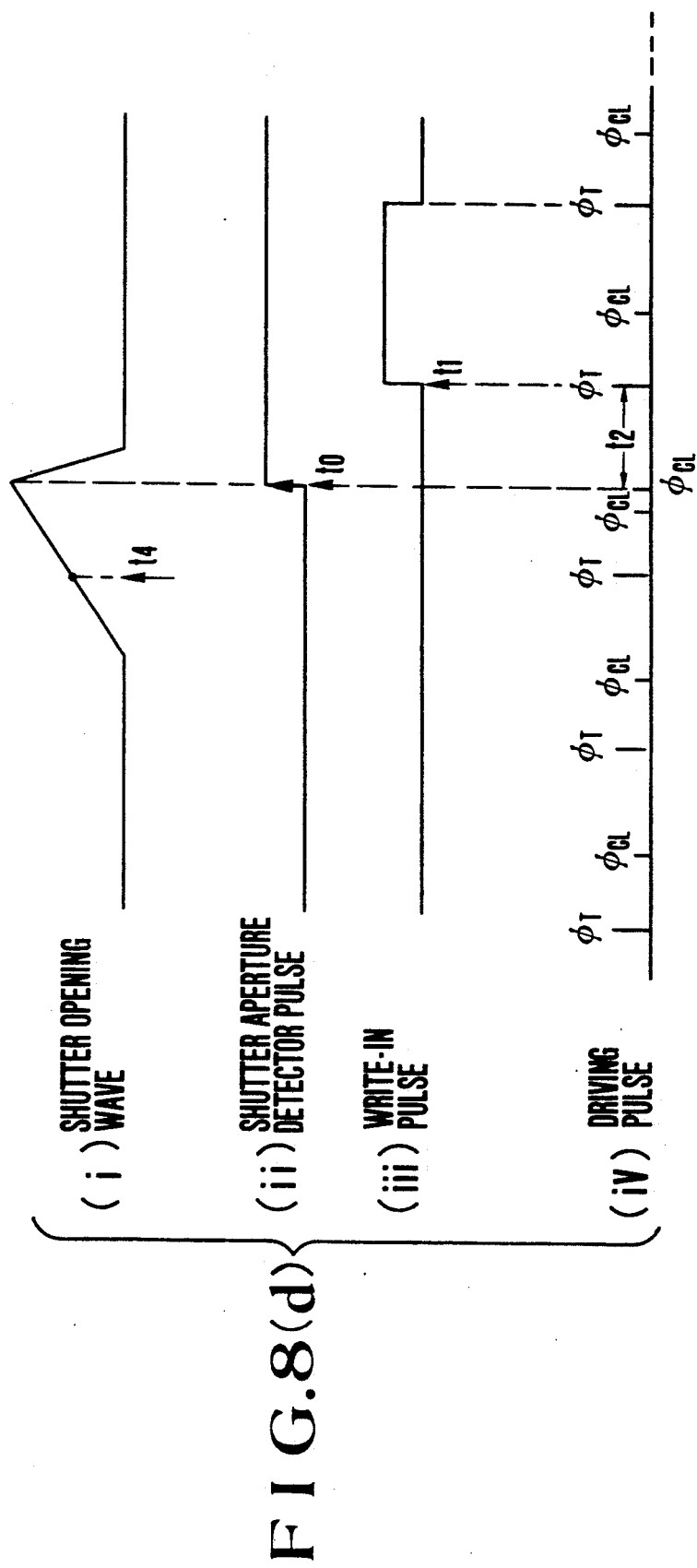

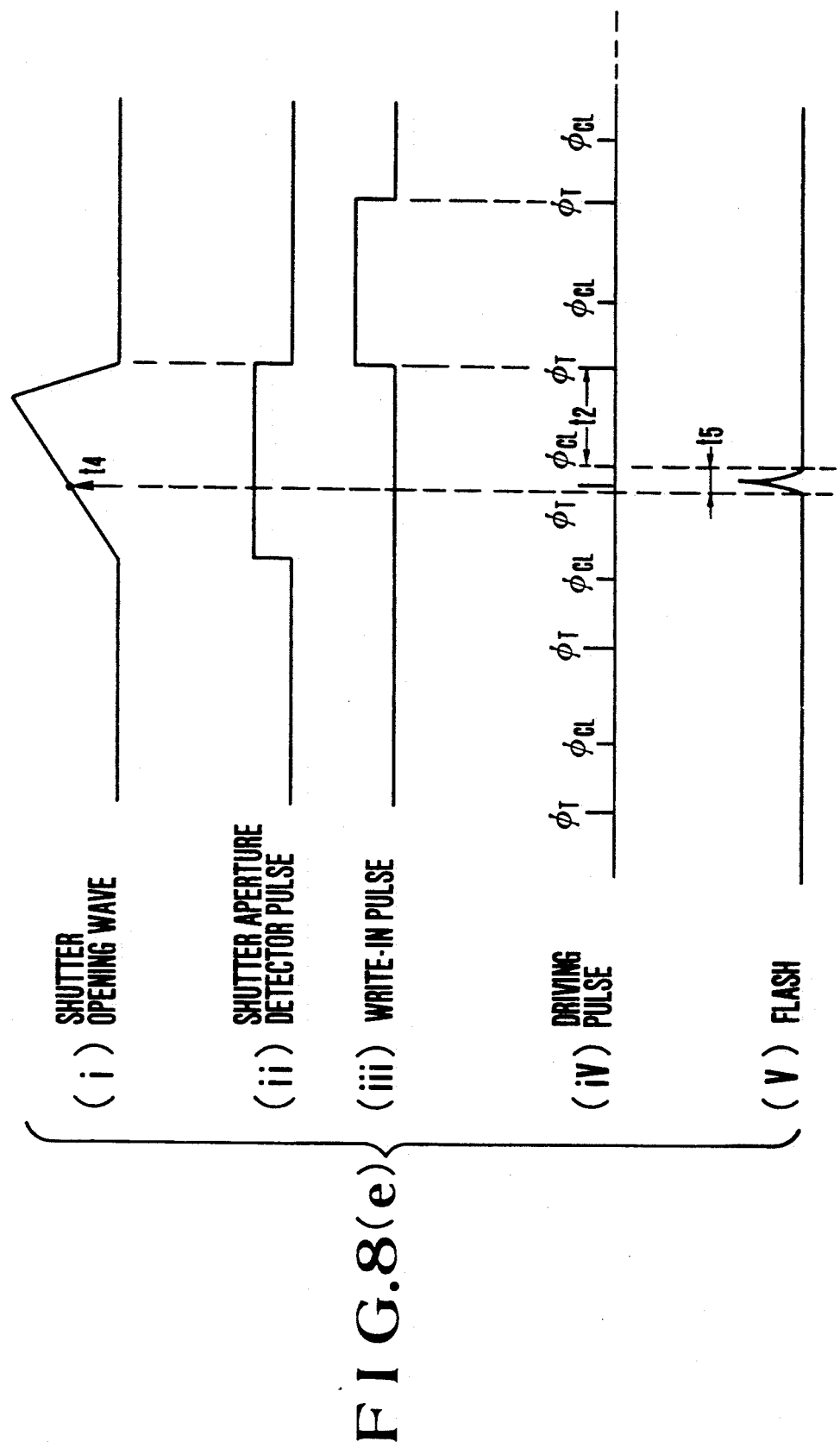

IMAGE PICKUP APPARATUS

This is a continuation application under 37 CFR 1.62 of prior application Ser. No. 511,990, filed Apr. 12, 1990, which is a continuation of application Ser. No. 277,535, filed Nov. 28, 1988, which is a continuation of application Ser. No. 037,463, filed Apr. 13, 1987.

BACKGROUND OF THE INVENTION

1. Field of the Invention

The present invention relates to an image pickup apparatus, particularly an image pickup apparatus wherein the image of an object (an optical image) is converted by an image sensing device into video signals, which are then supplied to a monitor.

2. Description of the Related Art

Conventionally, such apparatuses have been used that an optical image is converted by an image sensor into video signals, which are then supplied and displayed on a monitor such as an electronic viewfinder contained in the image pickup apparatus.

An example of these apparatuses is known as U.S. Pat. No. 4,303,322 assigned to the assignee of the present invention.

However, the conventional apparatuses have presented the disadvantage that they cannot control the exposure of the image sensor with the first taken-in video signal and thus display an inaccurately-exposed image of very low visibility, because they take in the first video signal from the image sensor and control the exposure of the image sensor, based upon the level of the first taken-in video signal.

SUMMARY OF THE INVENTION

An object of the present invention is to provide an image pickup apparatus that can eliminate the above-described disadvantage and permit its monitor to display good and clear images.

Another object of the present invention is to provide an image pickup apparatus that permits its monitor to display good images rapidly.

According to a preferred embodiment of the present invention to attain this object, an image pickup apparatus in which an optical image is converted by an image sensor into video signals to be supplied to a monitor comprises control means for controlling the exposure of the image sensor and inhibiting means for inhibiting the monitor from displaying the video signals when the exposure is not correctly controlled.

A further object of the present invention is to provide means for permitting of confirming the images recorded in an image pickup apparatus immediately and easily with small electric power.

Another object of the present invention is to provide means for permitting of confirming an optical image to be recorded in an image pickup apparatus, with ease and small electric power as well as without any necessity of viewing the optical image through an optical finder.

According to a preferred embodiment of the present invention to attain this object, an image pickup apparatus in which an optical image is converted by an image sensor into video signals to be supplied to a monitor comprises trigger means for producing a trigger signal for recording the optical image, and controlling means for holding the display of the monitor for a determined period of time with the timing corresponding to the trigger signal, so that the display of the monitor can be held for the predetermined period of time with the timing corresponding to the trigger signal, that the recorded optical image can be easily confirmed and that the display held in the monitor can be automatically released after the predetermined period of time.

A further object of the present invention is to provide a new configuration or disposition of an image pickup apparatus comprising a radiation sensitive element such as silver-halide film to reproduce an optical image as a visible image as well as an image sensor having photoelectric conversion.

According to a preferred embodiment of the present invention to attain this object, there is disclosed an image pickup apparatus comprising first optical means for forming an optical image on a radiation sensitive element and second optical means provided independently from the first optical means for forming the optical image on an image sensor, wherein the second optical means is a pan-focusing optical system and wherein the second optical means independent from the first optical means permits not only use of a relatively small image sensor, but provides video signals of high clearness from the image sensor on which the optical image is formed by the pan-focusing optical system.

Another object of the present invention is to provide an image pickup apparatus comprising the image sensor and the radiation sensitive element that permits an excellent pickup operation in various photographic modes such as flash photography, or permits the user to confirm the pickup operation effectively.

The other objects and features of the present invention will be well understood by reading the description of the preferred embodiments given by referring to the drawings annexed hereto.

BRIEF DESCRIPTION OF THE DRAWINGS

FIGS. 8(a) to 8(e) are time charts showing the timing with which the video signals from the CCD chip 6 are written in the memory 33 as shown in FIG. 3.

DETAILED DESCRIPTION OF THE PREFERRED EMBODIMENTS

Figure 1:
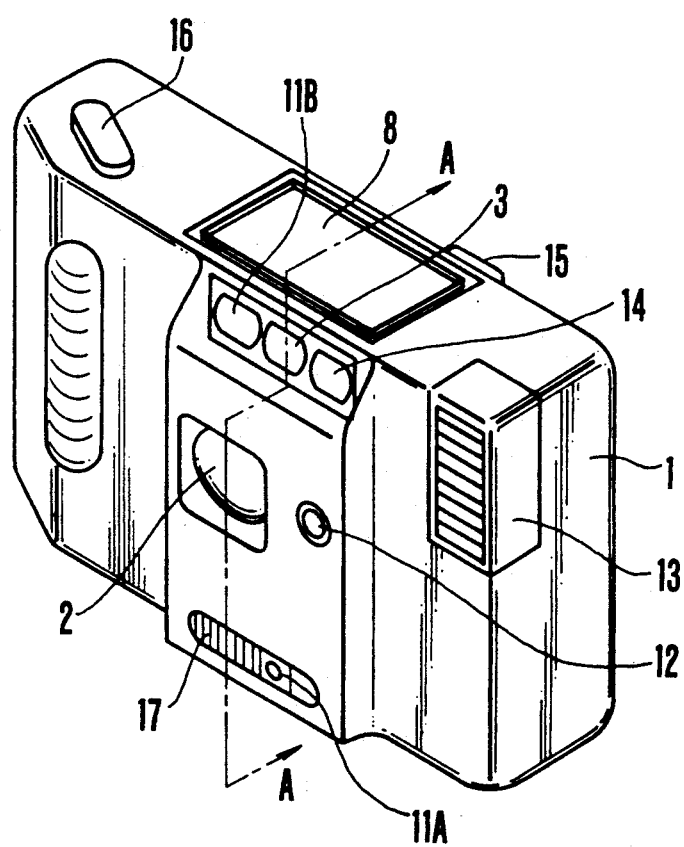
FIG. 1 is an oblique view showing an image pickup apparatus according to a preferred embodiment of the present invention.

An image pickup apparatus according to a preferred embodiment of the present invention will be described below by referring to the drawings annexed hereto.

Figure 2:
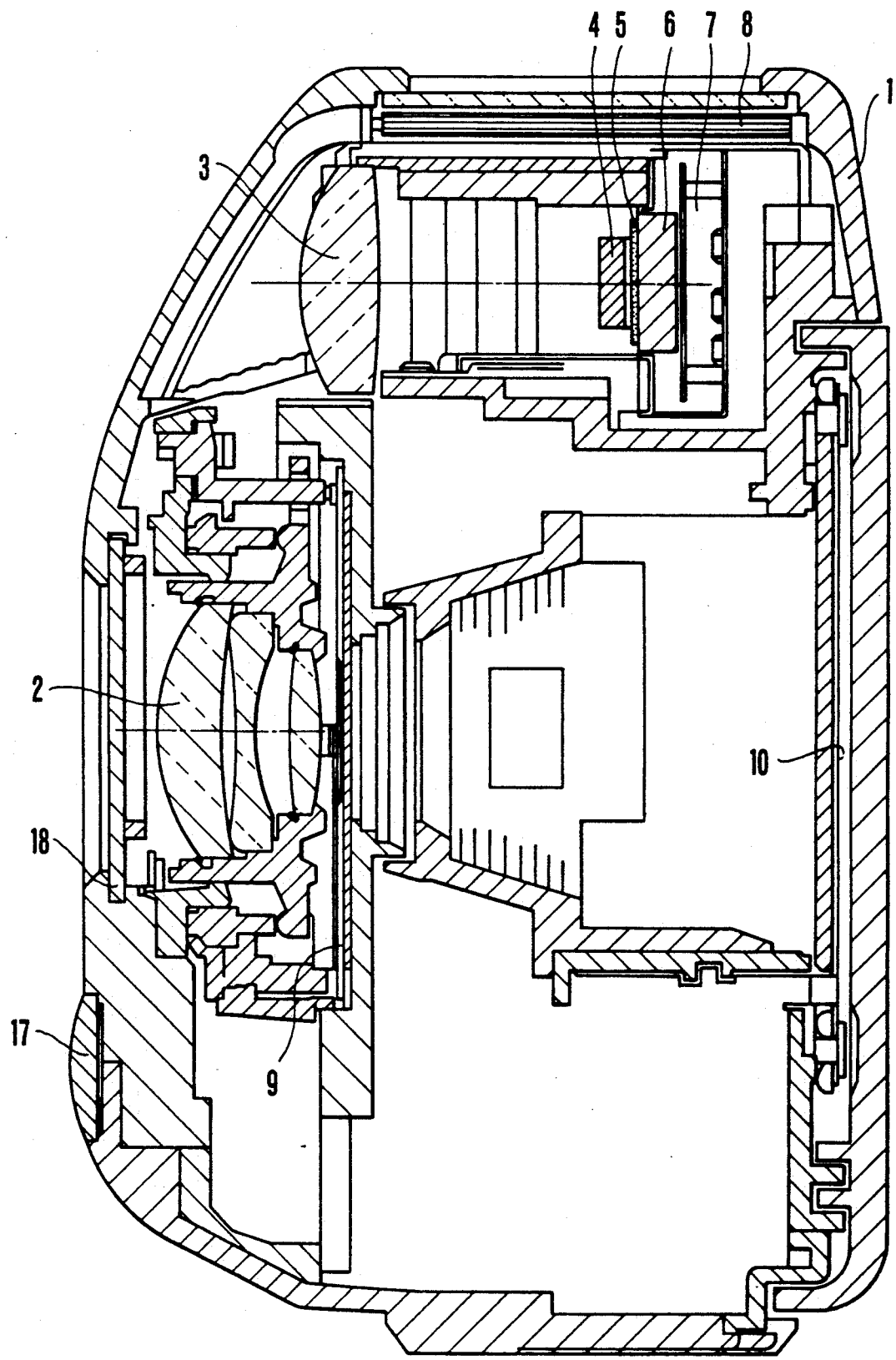
FIG. 2 is a cross-sectional view showing the image pickup apparatus cut along the line A—A as shown in FIG. 1.

FIG. 1 is an oblique view showing an image pickup apparatus according to a preferred embodiment of the present invention. FIG. 2 is a cross-sectional view showing the image pickup apparatus cut along the line A—A as shown in FIG. 1.

In FIGS. 1 and 2, 1 is a housing which contains an image pickup apparatus body. 2 is an objective lens to form an optical image on a film held by a film pressing plate 10. 3 is a lens for a liquid crystal display (finder) 8 to form an optical image on a CCD chip 6. In this embodiment, the objective lens 2 is automatically focus-controlled, that is, automatically moved to the focusing position according to the measured distance information provided by a distance measuring portion comprising a light projecting part 11A and a light receiving part 11B. The lens 3 for the liquid crystal display 8 is a so-called "pan-focusing optical system", by which an optical image is always sharply formed on the CCD chip 6.

4 is a low-pass filter mounted on the CCD chip 6 to cut off a high component of the spatial frequency coming from the optical image of the object and thus to prevent the video signals produced by the CCD chip 6 from producing any folded distortion. 5 is a cover glass to protect the CCD chip 6 against any dust. Instead of the CCD chip 6 as used in this embodiment, it is understood that any other type of image sensor may be used such as MOS type or non-destructive read-out type.

7 is a circuit mounting part where are mounted circuits to process the signals from the CCD chip 6 and to drive a liquid crystal display (finder) 8. The liquid crystal display 8 is mounted on the upper part of the image pickup apparatus. Instead of the liquid crystal as used in this embodiment, any other display element, for example, a functional optical element such as ECD (Electrochromic Display Device) may be used.

9 is a shutter to control, that is, shut off or lead a beam of light to the film through the objective lens 2. 10 is the film pressing plate as described above. 11A and 11B are a light projecting part and a light receiving part respectively, which form a distance measuring portion. This embodiment employs the active distance measuring method. However, the passive distance measuring method may be used instead.

12 is a light measuring portion. The shutter 9 is controlled according to the measured light information provided by the light measuring portion 12.

13 is a flash device that provides a flash light when the brightness of an object is lower than the required value.

14 is an objective lens for the optical finder.

15 is an eye-piece for the optical finder.

In addition to the liquid crystal display 8, this embodiment is provided with an optical finder composed of the objective lens 14 and the eye-piece 15. Therefore, a correct framing may be performed also by using the optical finder.

16 is a release button. The first step of pressing will provide a light measuring operation, a distance measuring operation and a display by the liquid crystal display 8. The second step of pressing will drive the objective lens 2, the shutter 9 and the film winding means in turn.

17 is a barrier lever to open or close a barrier 18. Opening the barrier 18 will permit electric power to the parts of the image pickup apparatus.

Figure 3:
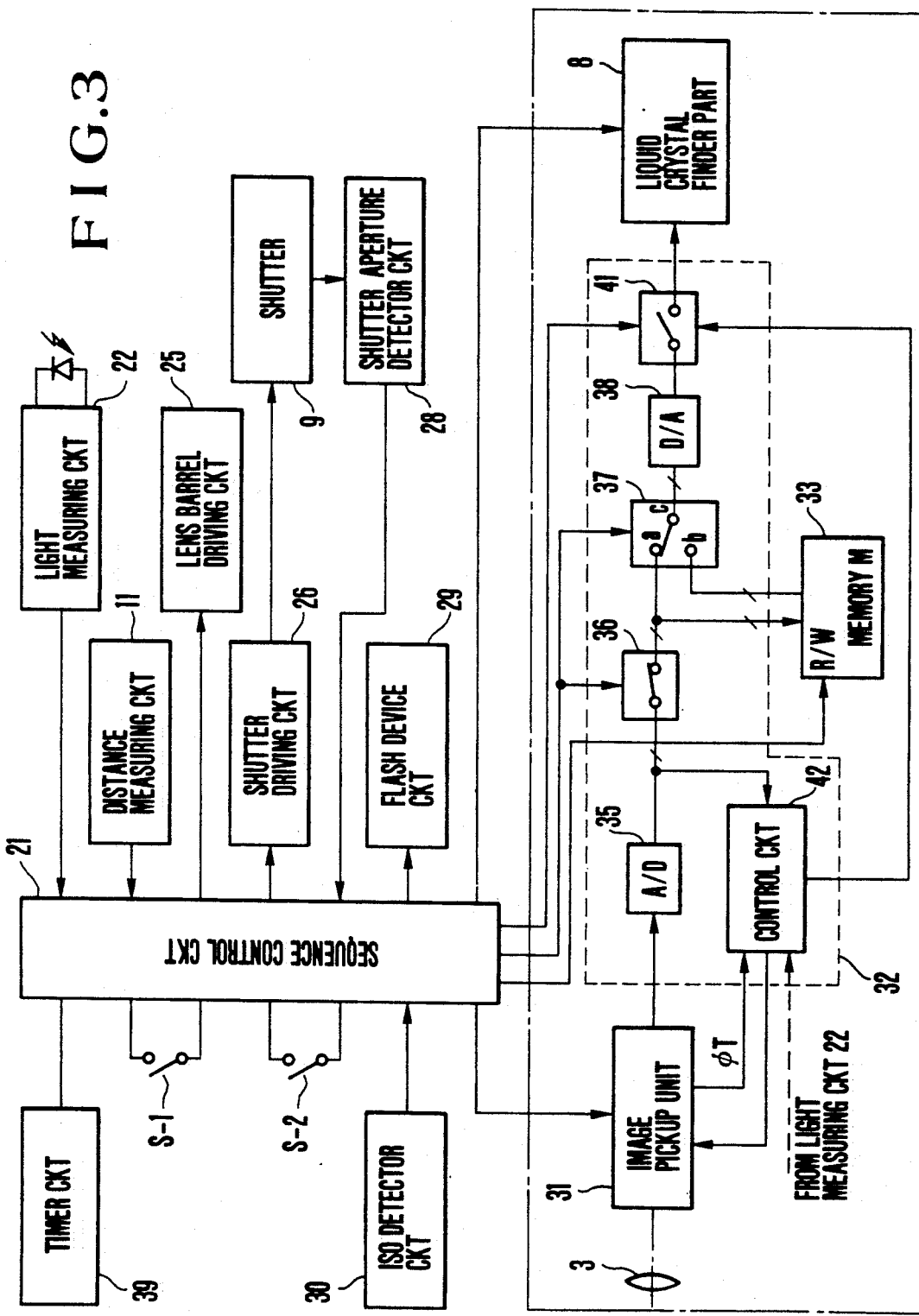
FIG. 3 is a block diagram showing a preferred embodiment of the present invention.

The electric circuitry of the image pickup apparatus thus composed will be described below by referring to FIG. 3 showing the block diagram.

In FIG. 3, the elements having the same functions as those as shown in FIGS. 1 and 2 will be same numbered, and their descriptions will be omitted.

In FIG. 3, 21 is a sequence control circuit to control the operations of the parts of the image pickup apparatus sequentially. 22 is a light measuring circuit that transfers the shutter control data to the sequence control circuit 21 according to the output of the light receiving device provided in the light measuring portion 12. 25 is a lens barrel driving circuit that drives the objective lens 2 according to the measured distance information transferred by the distance measuring portion (circuit) 11.

26 is a shutter driving circuit that controls the shutter 9 as shown in FIG. 1 according to the output of the light measuring circuit 22. 28 is a shutter aperture detector circuit that detects the opening start and full opening states of the shutter 9. 29 is a flash device circuit of the flash device 13 as shown in FIG. 1. 30 is an ISO detector circuit that detects the DX code information of a film, or the ISO information of a manually set film. 31 is an image pickup unit comprising the CCD chip 6 and the driving circuit thereof. 32 is a picture processing circuit that processes the image signals transmitted by the image pickup unit 31, and comprises an A/D converter 35, a D/A converter 38, and a control circuit 42 to control the drive timing of the CCD chip 6 in the image pickup unit 31, as well as switches 36, 37 and 41.

33 is a R/W memory wherein the read-out and write-in operations are controlled by the sequence control circuit 21. The memory 33 writes in the output of the A/D converter 35 through the switch 36 when the write command is transferred from the sequence control circuit 21 to the memory 33. The memory 33 reads out the stored video signals through the switch 37 when the read-out command is transferred from the sequence control circuit 21 to the memory 33. The memory 33 has a capacity of storing the video signals corresponding to one frame of picture.

The switches 36 and 37 are selector switches for still image and moving image modes, which are controlled by the control signals coming from the sequence control circuit 21. 39 is a timer circuit driven by the sequence control circuit 21. The switch 41 turns on and off the liquid crystal display 8 to display an image.

With the switch 41 set in ON and the switch 36 in ON and the switch 37 in the position a, the output of the image pickup unit 31 is applied to the liquid crystal display 8 through the A/D converter 35, the switch 36, the bridge a-c of the switch 37, the D/A converter 38 and the switch 41. As the result, the liquid crystal display 8 is set in the moving image display mode as long as the image pickup unit 31 is continuously driven.

With the switch 36 set in OFF and the switch 37 in the position b, the output of the memory 33 is applied to the liquid crystal display 8 through the bridge b-c of the switch 37, the D/A converter 38 and the switch 41. As the result, the still image stored in the memory 33 is displayed on the liquid crystal display 8.

S-1 is a switch that is turned on by the first step of pressing the shutter release button 16.

S-2 is a switch that is turned on by the second step of pressing the shutter release button 16.

Figure 4:
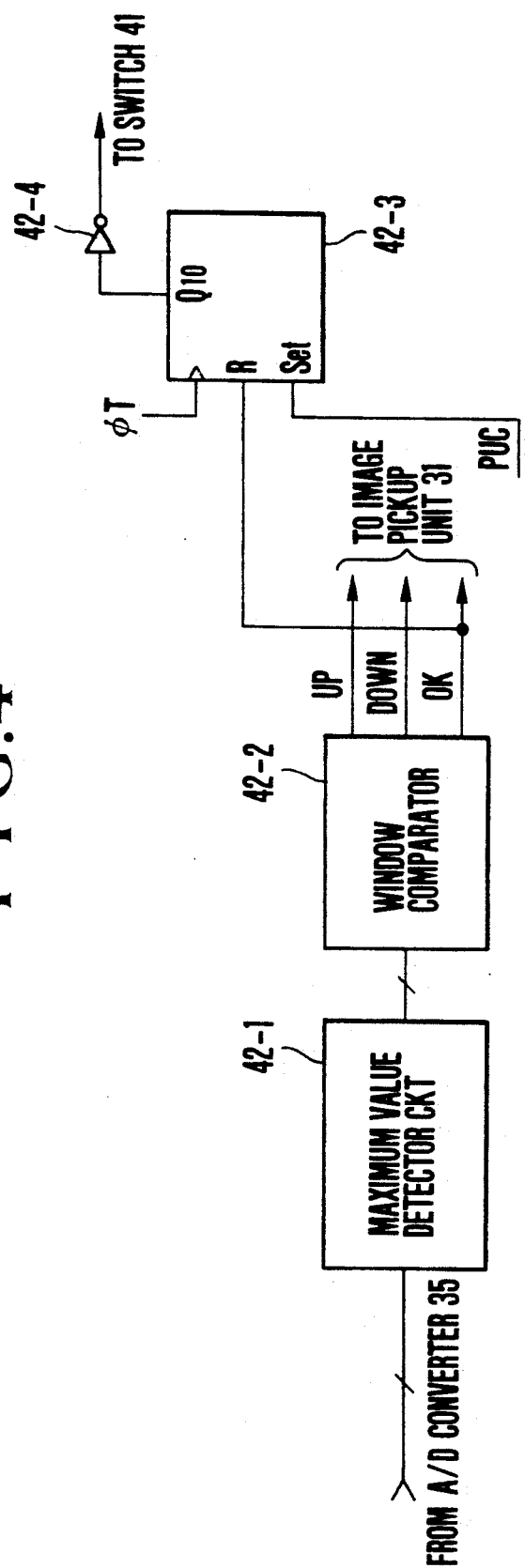
FIG. 4 is a detailed block diagram showing the control circuit 42 as shown in FIG. 3.

42 is the control circuit as described above and shown in FIG. 4 in detail. In FIG. 4, 42-1 is a maximum value detector circuit that detects the maximum value of the digital signal transmitted by the A/D converter 35 and holds the maximum value for a predetermined period of time till the pulse $\phi T$ as described hereinafter is provided. 42-2 is a window comparator that determines if the maximum value held by the maximum value detector circuit 42 is within the predetermined limits, that is, if the video signal reaches the proper level or not. If the level of the video signal is lower than the proper value, the signal of the terminal UP is set to "1", and the image pickup unit 31 is controlled so that the storing time of the CCD chip 6 will be longer and that the video signal level will be higher. If the video signal level is higher than the proper value on the contrary, the signal of the terminal DOWN is set to "1", and the image pickup unit 31 is controlled so that the storing time of the CCD chip 6 will be shorter and that the video signal level will be lower.

If the video signal level is proper, the signal of the terminal OK is set to "1", and the image pickup unit 31 is controlled so that the storing time will not be changed. The signal of the terminal OK is then applied to a preset counter 42-3, in which a PUC pulse is then entered. After the power is supplied to the image pickup apparatus by opening the barrier 18 and until the video signal level reaches the proper value, the terminal Q10 of the preset counter 42-3 is set in "1" and the switch 41 is set in OFF by the signal "0" from the inverter 42-4. Thus, the liquid crystal display 8 is prohibited from providing any display with any signal of improper level.

Once the video signal level reaches the proper value, the counter 42-3 is reset and the terminal Q10 is set to "0". The output of the terminal Q10 is inverted to "1" by the inverter 42-4 and turns on the switch 41, so that the liquid crystal display 8 is enabled to provide a display.

In this embodiment, even if the video signal level which has been at the proper value is changed out of the proper value to set the terminal OK to "0", the output of the terminal Q10 in the counter 42-3 remains in "0" till the counter 42-3 counts the pulse $\phi$T by 10 pulses without being reset. The output inverted by the inverter 42-4 to "1" leaves the switch 41 in ON till the counter 42-3 counts 10 pulses without being reset. Till then, the liquid crystal display 8 continues to display.

Thus, the liquid crystal display 8 provides no display after the opening of the barrier 18 and till the video signal level reaches the proper value. Once the video signal level reaches the proper value, the liquid crystal display 8 starts and continues to display an image till the output of the terminal Q10 is set to "1", and it stops displaying only when the brightness of the object is too high or low to control the storing time of the CCD chip 6. Consequently, no flickering display can be provided on the liquid crystal display 8. In this embodiment, the liquid crystal display 8 is prohibited from providing any display when the video signal level is not at the proper value, even if the counter 42-3 counts 10 pulses $\phi$T, that is, if the counter 42-3 reads out 10 video signals from the CCD chip 6 to change the storing time by 10 times. However, the impossibility of controlling the storing time as described above may be detected by the other means, for example, by using the output of the light measuring circuit 22.

In the control circuit 42 as shown in FIG. 4, the storing time of the CCD chip 6 is controlled according to the video signal level. Alternatively, the storing time may be controlled according to the output of the light measuring circuit 22 as shown by the broken line in FIG. 3. In this case, the circuit as shown in FIG. 4 is not necessary so that the configuration of the system is simplified.

The configuration of the CCD chip 6 used in the image pickup unit 31 as well as the driving circuit for the CCD chip 6 will be detailed below by referring to FIG. 5.

Figure 5:
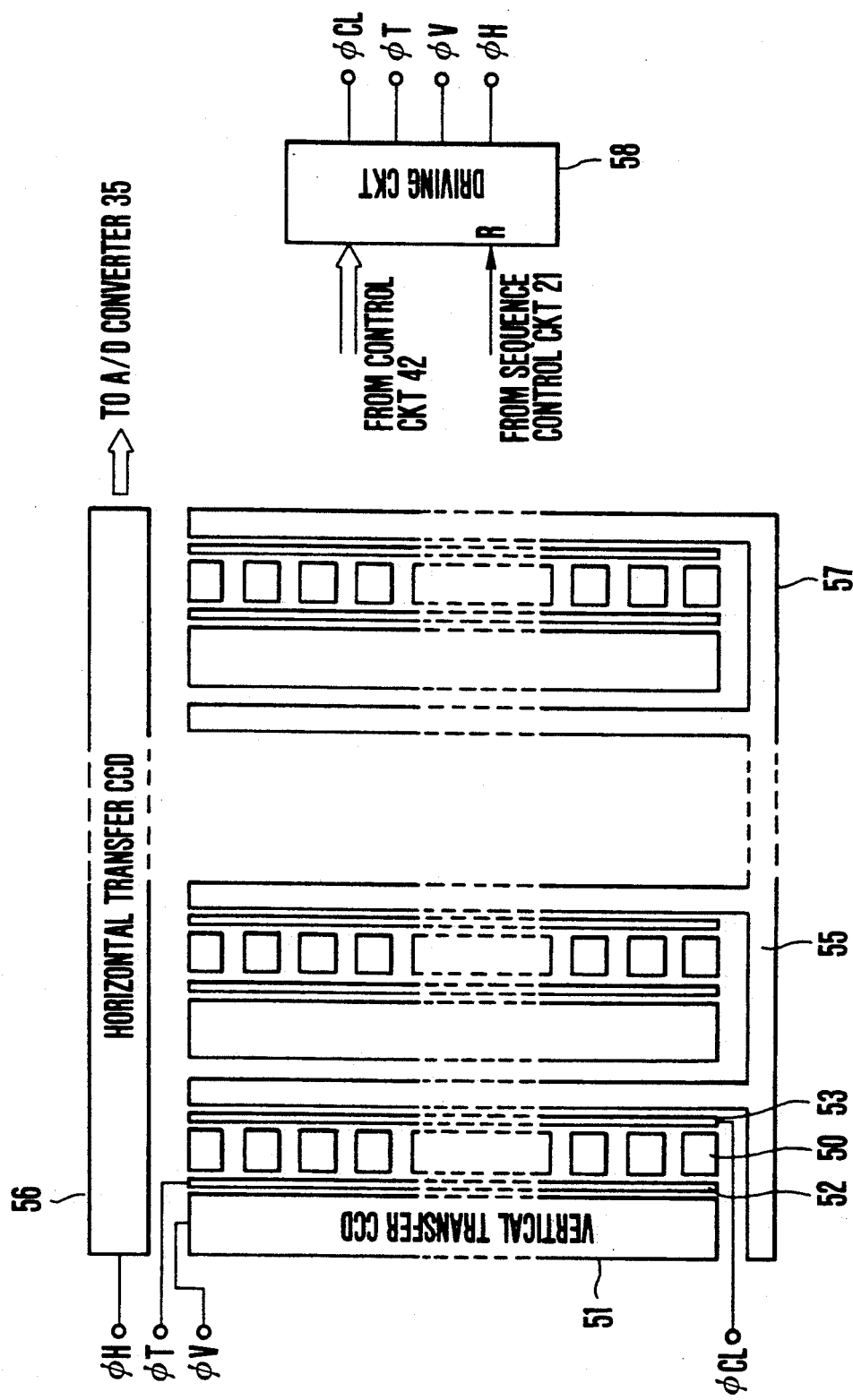
FIG. 5 shows the configuration of the CCD chip 6 and the driving circuit of the CCD chip 6 as shown in FIG. 1.

FIG. 5 shows the configuration of the CCD chip 6 and the driving circuit of the CCD chip 6. In FIG. 5, 50 is a light sensitive element forming a picture element. On the CCD chip 6, for example, 500 sensitive elements are vertically arrayed and 500 sensitive elements are horizontally arrayed, so that a matrix of sensitive elements is formed.

The signals stored in the light sensitive elements 50 are transferred to a vertical transfer CCD 51 through a read-out gate 52 and read out by a horizontal transfer CCD 56 in turn.

Particularly, the signals stored in the light sensitive elements 50 are transferred to the vertical transfer CCD 51 by applying the read-out pulse $\phi$T to the read-out gate 52 and opening the gate 52. The vertical transfer CCD 51 is driven by a vertical transfer pulse $\phi$V. Each time when a vertical transfer pulse $\phi$V is applied to the vertical transfer CCD 51, the number of horizontal transfer pulses $\phi$H equal to the number of horizontal picture elements is applied to the horizontal transfer CCD 56, and the signals stored in the sensitive elements 50 are sequentially read out and transferred to the A/D converter 35.

A drain gate 53 is opened with a clear pulse $\phi$CL applied to it, and the signals stored in the sensitive elements 50 flow in a drain 57 and the sensitive elements 50 are cleared. Thus, the storing time in the CCD chip 6 is a lapse of time from the time when the pulse $\phi$CL is applied to the drain gate 53 to clear the sensitive elements 50 to the time when the pulse $\phi$T is applied to the read-out gate 52 to read out the signals stored in the sensitive elements 50.

58 is a driving circuit to transmit the pulses $\phi$CL, $\phi$T, $\phi$V and $\phi$H as described above. The timing for the driving circuit 58 to transmit the clear pulse $\phi$CL is controlled according to the output signal of the control circuit 42, that is, according to the level of the video signal delivered by the image pickup unit 31. Thus, the storing time in the sensitive elements 50 is controlled so that the video signal level will not overflow.

Figure 6:
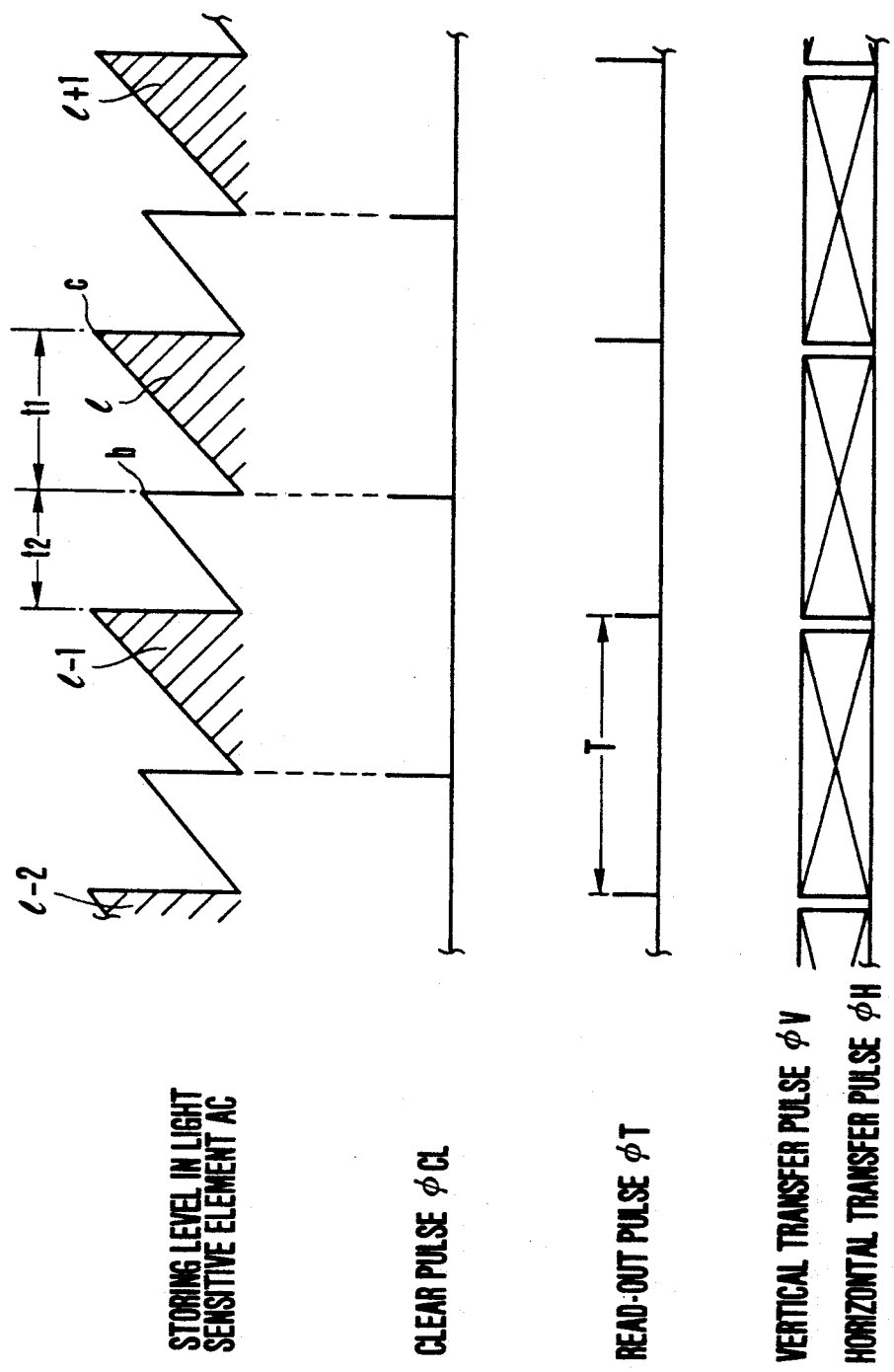
FIG. 6 is a time chart showing the pulses produced by the driving circuit 58 as shown in FIG. 5.

FIG. 6 is a time chart showing the pulses produced by the driving circuit 58.

In FIG. 6, AC shows the levels of signals stored in the sensitive elements 50. $\phi$CL, $\phi$T, $\phi$H and $\phi$V show the timing with which the pulses $\phi$CL, $\phi$T, $\phi$H and $\phi$V are produced respectively. The pulses $\phi$H and $\phi$V are sequentially produced at the same intervals of T as the read-out pulse $\phi$T. The pulses $\phi$H and $\phi$V are largely different in frequency from each other. However, they are commonly shown in FIG. 6 to make them easily understood.

In FIG. 6, the storing time of the sensitive element 50 is shown by t2, while t1 is the period of time when the stored signal is cleared in the drain with the clear pulse $\phi$CL.

The timing with which the clear pulse $\phi$CL is produced will be described below by referring to FIG. 6. The driving circuit 58 controls the timing of the clear signal so as to make the period t1 shorter and the period t2 longer (t1+t2=T is constant), if the read-out video signal 1−1 is on a higher level corresponding to an excessive exposure, or to make the period t1 longer, if the read-out video signal 1−1 is on a lower level corresponding to an insufficient exposure. Thus, the exposure of the CCD chip 6 can be correctly controlled through repetition of this practice.

Therefore, according to this embodiment, the optimum video signal level can be provided by controlling the storing time of the CCD chip 6. This presents the advantage that it is not necessary to provide the finder optical system comprising a finder lens 3 with a diaphragm having an aperture controlled according to the brightness of an object.

The operation of the embodiment having the configuration as described above will be described below by referring to FIG. 7, which shows a flow chart of operations.

Even if the barrier 18 is opened, the liquid crystal display 8 provides no display in the conditions that the release button 16 is not pressed and that the switches S-1 and S-2 are set in OFF. (Repeat the step #-1.)

When the release button 16 is then pressed by the first stroke, the switch S-1 is closed and the sequence control circuit 21 actuates the light measuring circuit 22 to measure the brightness of an object and resets the timer circuit 39 (#-2). If the measured light value is higher than the predetermined value, the switch 37 is set in the position a, the switch 36 is set to ON and the switch 41 is set to ON (#-4). Then, the trigger signal is applied by the sequence control circuit 21 to the image pickup unit 31, the driving circuit 58 is started in operation, and the liquid crystal display 8 starts to provide a display (#-5). Particularly, the clear pulse $\phi CL$, read-out pulse $\phi T$, vertical transfer pulse $\phi V$ and horizontal transfer pulse $\phi H$ as shown in FIG. 6 are delivered in turn. When the video signals provided by the image pickup unit 31 reach the optimum level, the liquid crystal display 8 provides the display in the moving image mode. If the measured light value is lower than the predetermined value on the contrary, the flash device circuit 29 is operated to start the charging. If the brightness of an object is lower, however, the liquid crystal display 8 may be disabled by jumping the flow from the step #-3 to the step #-1 (differently from the flow as shown in FIG. 7) and thus applying no trigger signal from the sequence control circuit 21 to the image pickup unit 31.

If the switch S-1 is closed and if the measured light value in the light measuring circuit 22 is higher than the predetermined value, as described above, the driving circuit 58 in the image pickup unit 31 is automatically operated to produce the pulses $\phi CL$, $\phi T$, $\phi V$ and $\phi H$ sequentially and to display a moving image on the liquid crystal display 8, as described above. In these conditions, the storing time of the image pickup unit 31 is controlled so that the image pickup unit 31 will deliver the optimum video signal level with the output of the control circuit 42 as described above.

Then, it is determined if the switch S-2 is turned on or not (#-6). If the switch S-2 is turned on, the flow proceeds to the step #-9 on which the image pickup operation is started. If the switch S-2 remains in OFF for the determined period of time, the liquid crystal display 8 is disabled to display (#-8) and the flow returns to the step #-1. Thus, if the switch S-1 remains in ON for the predetermined lapse of time, the liquid crystal display 8 stops displaying automatically to save the useless power consumption of the battery.

To stop the display operation, the image pickup unit 31 may be stopped, or otherwise the liquid crystal display 8 may be stopped with the image pickup unit 31 driven, or both the image pickup unit 31 and the liquid crystal display 8 may be stopped. Alternatively, the switch 41 may be turned off.

It is recommended that the predetermined period of time on the step #-7 as described above is set as necessary and sufficient for the photographer to perform the framing (for example, about 5 seconds to 10 seconds).

If the release button 16 is pressed down to the second step during the predetermined period of time to turn on the switch S-2, the lens barrel is driven to the focusing position according to the measured distance information provided by the distance measuring portion 11 (#-9), the liquid crystal display 8 stops displaying (#-10), and the shutter 9 is driven to open (#-11).

Then, the write-in pulse is applied to the memory 33 (#-12), and the video signal which has been read out of the CCD chip 6 synchronously with the read-out pulse $\phi T$ as shown in FIG. 6 is written in the memory 33 through the switch 36.

In this case, the first video signal stored in the CCD chip 6 after the shutter 9 has been opened is written in the memory 33.

When the shutter 9 is then closed (#-13), the film is taken up by the film winding circuit (not shown). At the same time, the read-out pulse is applied to the memory 33, the switch 37 is set in the position b, and the liquid crystal display 8 displays the reproduced image stored in the memory 33, that is, the liquid crystal display 8 turns in the still image display mode (#-14).

On the step #-14, the operation of the image pickup unit 31 may be stopped so that the pulses $\phi V$, $\phi H$, $\phi T$ and $\phi CL$ will not be produced.

The image reproduced on the liquid crystal display 8 is synchronous with the opening start of the shutter 9, as described above, and thus with the picture taken on the film. Consequently, the photographer can check the shutter operating time and the framing on viewing the confirmation image automatically displayed as still image on the liquid crystal display 8, after he has shot an object. If he is not satisfied with the image, he may take another picture immediately. He may explain his taken photo and the framing to the other(s) on the spot.

After the liquid crystal display 8 has been set in the still image display mode on the step #-14, the lapse of time is measured by a timer. If the switch S-1 is not turned on within the predetermined period of time, the liquid crystal display 8 is automatically stopped in displaying, that is, the still image display mode is stopped (#-15 and #-16).

This stop of displaying contributes to saving the power consumption, as the stop of the moving image display mode by the timer does as described on the steps #-1 to #-8. It is recommended that the predetermined period of time on the step #-16 may be set as necessary and sufficient for the photographer to confirm the still image after shooting.

If the photographer presses the release button 16 again to take the next picture before the predetermined period of time passes, the flow branches from the step #-15 to the step #-2 when the switch S-1 is turned on by the first step of pressing. Then, the light measuring operation is restarted, and the distance measuring operation and the switch-over to the moving image display mode are subsequently performed, as described above. The subsequent operations are as described hereinbefore.

It is understood that a step of turning off the power supply may be provided instead of the steps #-8 and #-17 (display stop). In this case, the power supply will be automatically turned off in the still image display mode or in the moving image display mode after the predetermined period of time while the switches S-1 and S-2 are not operated. This will result in a saving of power consumption.

Now, the timing with which the video signal is written in the memory 33 on the step #-12 will be detailed below by referring to FIG. 8(a).

Figure 8A:
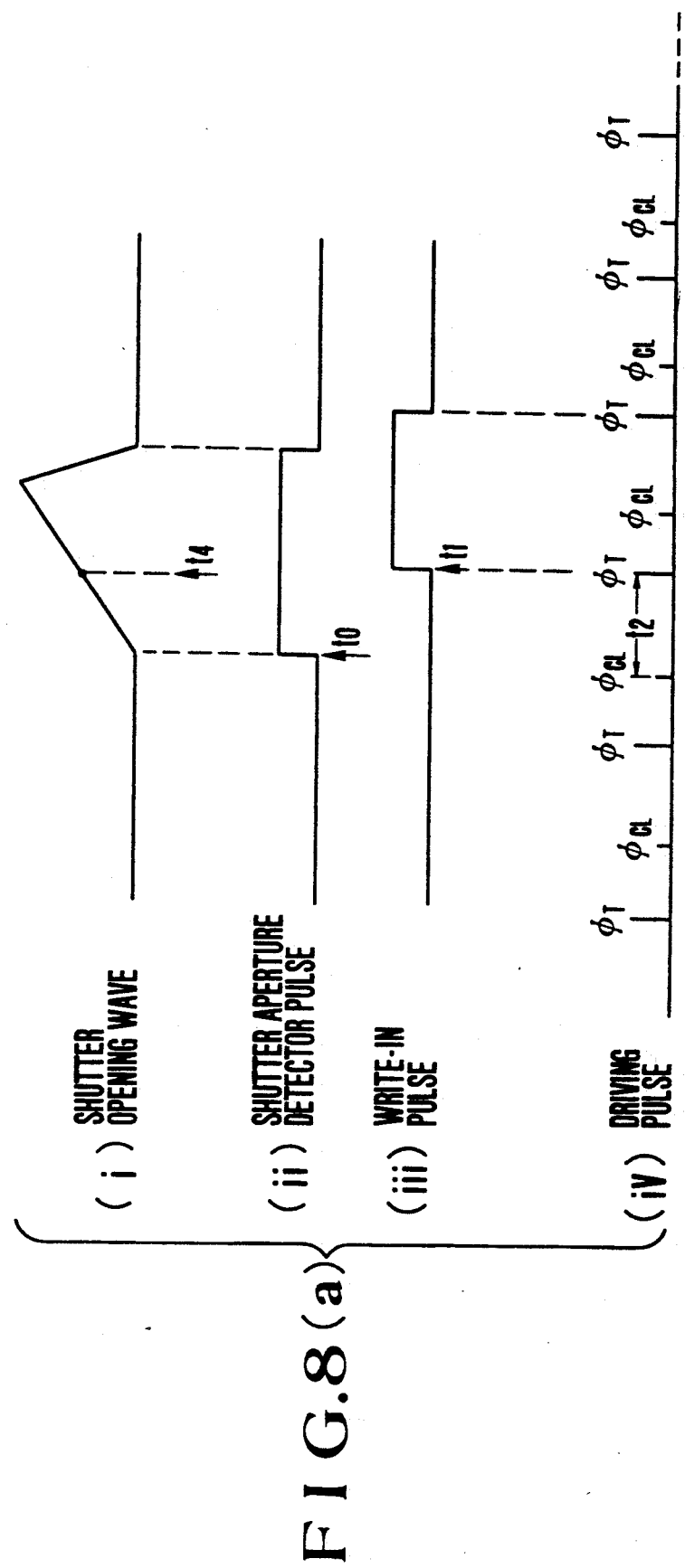

In FIG. 8(a), the wave (i) shows the opening wave of the shutter 9 which starts and operates in opening. The wave (ii) shows the shutter aperture detecting pulse which is applied by the shutter aperture detector circuit 28 to the sequence control circuit 21. The wave (iii) shows the write-in pulse which is applied by the sequence control circuit 21 to the memory 33. The wave (iv) shows the times when the clear pulse $\phi$CL and the read-out pulse $\phi$T as illustrated in FIG. 6 are applied to the CCD chip 6 respectively. As it is shown in FIG. 8(a), the time when the write-in pulse (iii) is applied to the memory 33 on the step #-12 is from the time when the shutter aperture is detected by the shutter aperture detector circuit 28 ($t_0$ in FIG. 8(a)) to the time when the first read-out pulse $\phi$T is applied to the CCD chip 6 ($t_1$ in FIG. 8(a)). In this case, the video signal to be written in the memory 33 is stored in the CCD during the period of time as shown by $t_2$ in FIG. 8(a).

Figure 8B:
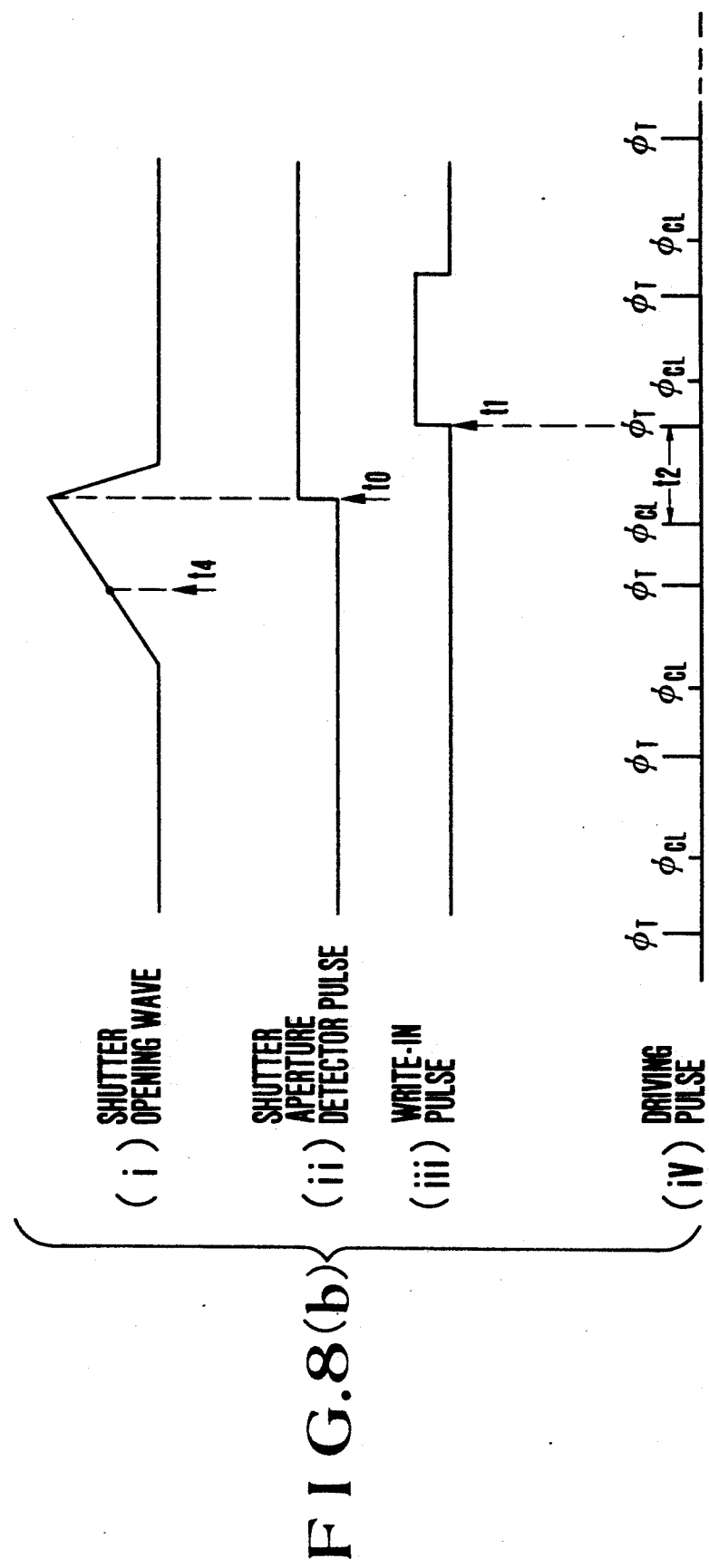

Alternatively, the write-in pulse (iii) may be applied to the memory 33 with the timing as shown in FIG. 8(b) by making the shutter aperture detector circuit 28 detect not the shutter aperture from opening start to closing, but the time when the shutter reaches the maximum aperture.

In this case, the video signal to be written in the memory 33 is provided by the CCD chip 6 (during the period of time $t_2$ as shown in FIG. 8(b)) with the first read-out pulse $\phi$T at the maximum aperture provided by the shutter aperture detector circuit 28. Namely, this video signal is the nearest to the image formed on the film.

In FIGS. 8(a) and 8(b), the driving pulses to be applied to the CCD chip 6 are delivered by the driving circuit 58 at the predetermined periods. If the driving circuit 58 is reset synchronously with the shutter aperture detecting pulse (ii), however, the video signal may be provided accurately in synchronization with the opening start or maximum opening of the shutter 9.

This case will be described by referring to FIGS. 8(c) and 8(d).

Figure 8C:
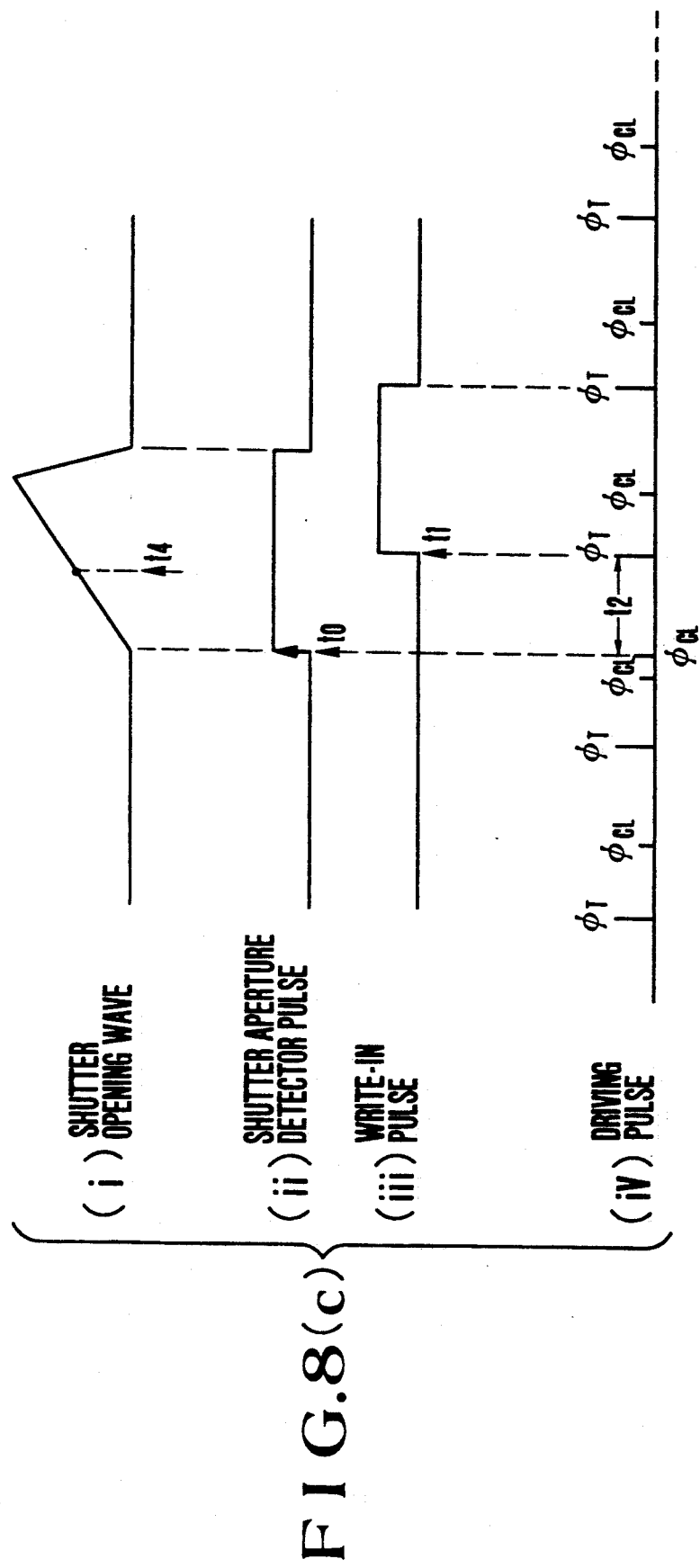

In FIG. 8(c), the driving circuit 58 is reset synchronously when the shutter aperture detector circuit 28 detects the clear pulse $\phi$CL (at the time $t_0$ as shown in FIG. 8(c)) to clear the light sensitive elements 50 of the stored signals once. Synchronously with the read-out pulse $\phi$T delivered (at the time $t_1$ as shown in FIG. 8(c)) after the storing period of time $t_2$ which is controlled so as to provide the optimum video signal level, the driving circuit 58 delivers the write-in pulse (iii), with which the video signal stored in the CCD chip 6 during the period of time $t_2$ is written in the memory 33.

Therefore, in the case as shown in FIG. 8(c), the video signal is written in the memory 33 accurately in synchronization with the detected opening start of the shutter 9.

In FIG. 8(d), the driving circuit 58 is reset synchronously with the detection of the maximum shutter aperture by the shutter aperture detector circuit 28, and the video signal stored in the CCD chip 6 is written in the memory 33 for the period of time $t_2$ as shown in FIG. 8(d).

In the embodiment as described above, the video signal stored in the CCD chip 6 is written in the memory 33 synchronously with the detection of the maximum shutter aperture. However, the video signal stored in the CCD chip 6 may be written in the memory 33 synchronously with the shutter closing signal.

Instead of the timing with which the maximum aperture of the shutter 9 is detected, the video signal may be written in the memory 33 with the timing as shown by $t_4$ in FIGS. 8(a) to 8(d), that is, the timing with which a signal provided in the course of shutter opening, for example, the synchronizing signal with the actuation of the flash device is delivered (at the time $t_4$ as shown in FIGS. 8(a) to 8(e)).

In this case, the video signal stored in the CCD chip 6 is written in the memory 33 with the almost same timing as the image is formed on the film.

Instead of using the timing with which the maximum shutter aperture is detected, the video signal stored in the CCD chip 6 may be written in the memory 33 with the timing where the switch S-2 changes its position in response to the second step of pressing the release button 16.

The sequence flow in which the flash photography is used for the lower brightness of an object will be described below.

Figure 7:
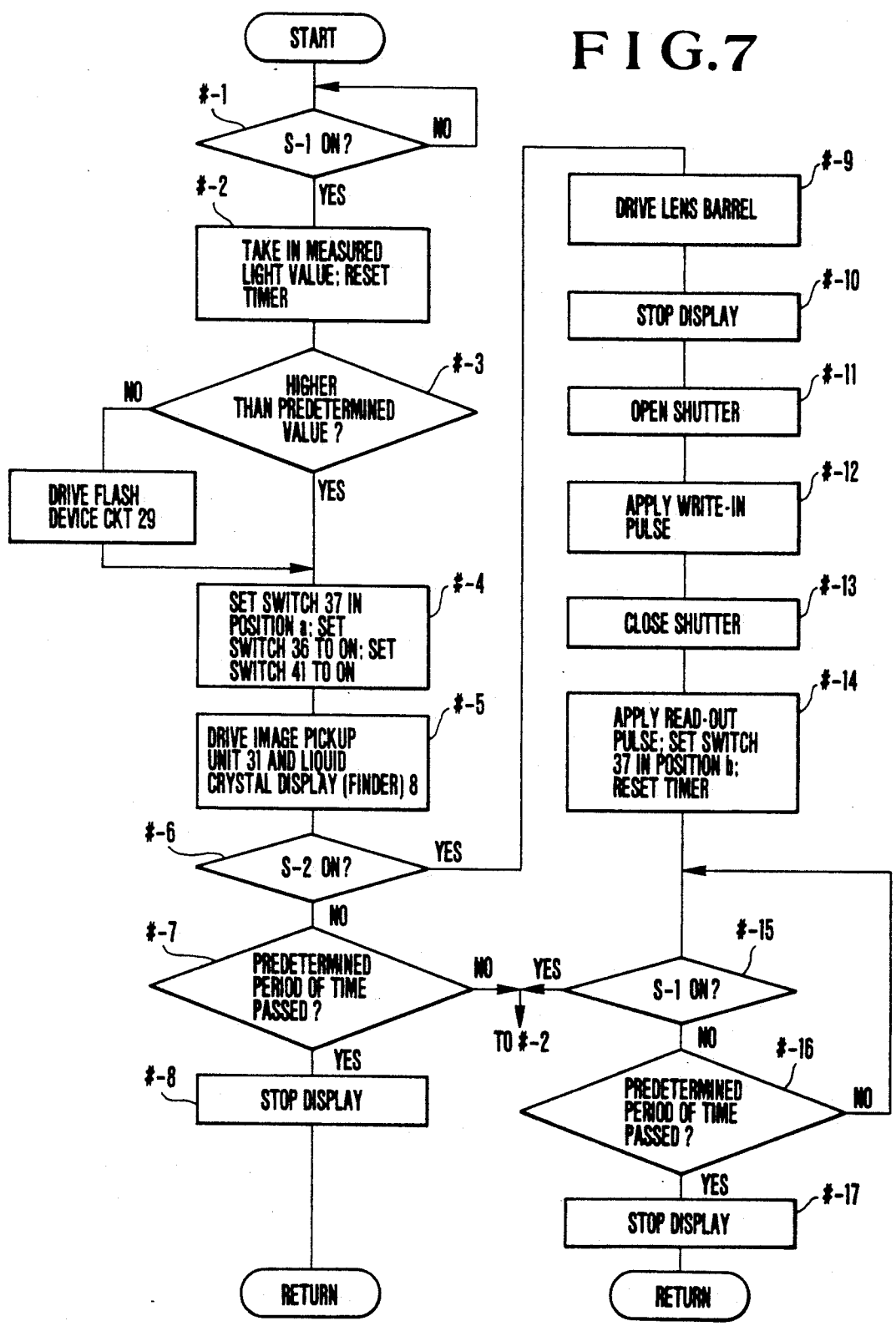
FIG. 7 is a flow chart illustrating the operations of the sequence control circuit 21 as shown in FIG. 3.

In the flash photography, the same sequence as illustrated in FIG. 7 is used with the exception that a different timing is used for the control on the step #-12, that is, the storing of video signals in the CCD chip 6.

In the flash photography, the video signals to be read out of the CCD chip 6 cannot be adequately controlled by changing the timing of the clear pulse $\phi$CL as described above by referring to FIG. 6.

Therefore, in this embodiment, the video signals stored in the CCD chip 6 are written in the memory 33 while the flash device is not operated, as shown in FIG. 8(e).

In FIG. 8(e), the wave form (v) shows the flash timing for the flash device 13, which is synchronous with the synchronizing signal, as shown by $t_4$ in FIG. 8(e). The flash time of the flash device 13 is much shorter than the opening time of the shutter.

In FIG. 8(e), the shutter opens, and the flash device 13 is operated at the time $t_4$.

After the period of time ($t_5$ as shown in FIG. 8(e)) from the production of the synchronizing signal to the end of operation for the flash device 13, the sequence control circuit 21 resets the driving circuit 58, which delivers the clear pulse $\phi$CL to clear the sensitive elements 50 of the stored signals once, and delivers the write-in pulse (iii) synchronously with the read-out pulse $\phi$T delivered after the period of time $t_2$ controlled so as to provide the optimum video signal level. As the result, the video signals stored in the CCD chip 6 are written in the memory 33 in the period of time $t_2$.

According to this embodiment, the image written in the memory 33 cannot be exposed to any radiation of the flash light, but only to the natural rays of light. Considering that the image formed on the film is exposed to the flash radiation, this method is found unsatisfactory in the aspect of image confirmation. By using this method, however, the storing time of the CCD chip 6 can be controlled by the method using the clear pulse both in the flash photography and in the natural light photography. For this reason, it is not necessary to provide the finder optical system before the CCD chip 6 additionally with a special diaphragm mechanism for the flash photography, and consequently the cost is more advantageous. (If a CCD of considerably high sensitivity even for a lower brightness is used, it is possible to pick up an image with the natural rays of light even for the film exposure that has conventionally required the flash light.)

As a variant of this embodiment, the aperture of a diaphragm mechanism designed for the lens 3 for the liquid crystal display may be changed according to the distance information provided by the distance measuring portion for the flash photography. (The aperture is opened for a long distance, while it is closed for a short distance.) Particularly, $F \propto C/d$ (C is constant) may be used wherein d is the distance to an object and F is an aperture.

In this embodiment, the video signals in the CCD chip 6 are written in the memory 33 with the timing as shown in FIG. 8(e) for the flash photography. If the lens 3 for the liquid crystal display is provided with a diaphragm mechanism as described above, however, the video signals may be written in the memory 33 with the timing as shown in FIGS. 8(a) to 8(d).

In the embodiment as described above, a still image is displayed on the liquid crystal display 8 when the switch S-1 is turned on by the second step of pressing the release button 16. If the predetermined period of time passed with the switches S-1 and S-2 remaining in OFF, the step #-15 in the flow as shown in FIG. 7 branches to the step #-17 where the display operation is stopped. Alternatively, the still image display mode may be automatically switched over to the moving image display mode by branching the step #-15 to the step #-4 in the flow chart as shown in FIG. 7.

In the embodiments as described above, silver-halide film is used as recording medium. The camera provided with the liquid crystal display 8 which displays video signals stored in the CCD chip 6 used in addition to the silver-halide film has been described hereinbefore. However, the present invention may be applied not only to an image pickup apparatus using the silver-halide film, but to a still video apparatus wherein an optical image is converted into electric signals and recorded in a magnetic medium.

In the embodiments as described above, the switch S-2 is used as trigger means for providing trigger signals used for recording an optical image, and the sequence control circuit 21 is used as control means for holding the monitor display for a predetermined period of time with the timing corresponding to the trigger signal.

In these embodiments, the objective lens 2 is used as first optical means for forming an optical image on a silver-halide film, and the liquid crystal finder lens 3 is used as second optical means for forming an optical image on the image sensing device.

According to the present embodiments as described above, the memory 33 provided as picture memory means in an still image pickup apparatus using a silver-halide film allows a photographer to check and confirm the shutter operating time and the framing for the picture just taken. In addition, the displaying means (liquid crystal display 8) can be as a finder on which an optical image is displayed as a moving image at the fixed periods before taking the picture.

Since liquid crystal is used for the displaying means, the displaying means has a possibility of enlargement and a higher flexibility in disposition than the conventional finders. For example, a finder of this type may be placed on the top face or back cover of an image pickup apparatus. An enlarged finder allows a photographer to observe an optical image on the finder with his face distant from the image pickup apparatus. This is very consistent also for a woman photographer who does not wish to bring her face make-up into contact with her image pickup apparatus. Although the quality of the image displayed by LCD or other on the finder may be inferior to those on the conventional optical finders in the present state of art, there is no problem, because the image pickup apparatuses have been recently so advanced in automatic focusing that there is no necessity of focusing through the finder, which is used only for framing.

According to the present embodiments, the lens 3 for the liquid crystal display is used as pan-focusing optical system. As the result, a clear and sharp image can be displayed on the liquid crystal display 8, even if the objective lens 2, automatically focused, is out of focus, and this is very convenient for framing.

In the embodiments as described above, the control circuit 42 as shown in FIG. 3 is used as means for controlling the substantial exposure of the image sensing device. Particularly, the control circuit 42 controls the exposure of the CCD chip 6 as image sensor by changing the timings with which the clear pulse $\phi CL$ and the read-out pulse $\phi T$ are applied to the CCD chip 6. However, a diaphragm may be used as means for controlling the amount of incident light in the image sensor.

According to the present embodiments, the maximum value detector circuit 42-1 is used to determine if the maximum value of output provided by the CCD chip 6 as image sensor is of an the adequate level or not, and thus to confirm that the exposure of the CCD chip 6 is properly controlled. However, the average output of the CCD chip 6 may be detected.

According to the embodiments as described above, the following effects are provided: (1) A relatively small type of image sensor can be used by using an independent type optical means for forming an optical image on the image sensor, and the image sensor can provide video signals of high clearness and sharpness by using a pan-focusing optical system as optical means; (2) It is possible for a photographer to confirm an optical image easily, because the monitor display is held for a predetermined period of time with the same timing as the optical image is recorded, and because the holding state is automatically released by a timer; and (3) When the exposure is not correctly controlled, video signals are not displayed on the monitor, so that an indistinct display can be prevented from being made.

What is claimed is;

1. An image pickup apparatus comprising:
   a) means for converting an optical image into an electrical signal;
   b) means for controlling an amount of light for said optical image to be converted into said electrical signal to be a predetermined amount;
   c) a monitor for displaying said optical image as a visible image corresponding to said electrical signal;
   d) means for inhibiting said monitor from displaying said visible image when said amount of light for said optical image is less than said predetermined amount;
   e) means for releasing the inhibition by said inhibiting means in response to said controlling means making said amount of light for said optical image said predetermined amount.

2. An image pickup apparatus according to claim 1, wherein said converting means includes a solid-state image sensing device.

3. An image pickup apparatus according to claim 2, wherein said controlling means controls a storing time of said image sensing device.

4. An image pickup apparatus according to claim 1, wherein said monitor is a liquid crystal display.

5. An image pickup apparatus according to claim 3, wherein said inhibiting means inhibits said monitor from providing any display when the storing time of said image sensing device is not adequately controlled by said controlling means.

6. A image pickup apparatus for visually displaying an image on a display monitor, comprising:
   a) means for converting an optical image into an electrical signal;
   b) means for controlling an amount of light for said optical image to be converted by said converting means to be a predetermined amount;
   c) means for inhibiting said display monitor from displaying said optical image corresponding to said electrical signal when the amount of light for said optical image is less than said predetermined amount; and
   d) means for releasing the inhibition by said inhibiting means in response to said controlling means making said amount of light for said optical image said predetermined amount.

7. An image pickup apparatus according to claim 6, wherein said converting means includes a solid-state image sensing device.

8. An image pickup apparatus according to claim 6, wherein said converting means is of integration type and wherein said controlling means controls an integration time of said converting means.

9. An image pickup apparatus according to claim 6 wherein said controlling means controls said light amount to be said predetermined amount on the basis of a level of said electrical signal so that said level reaches an adequate value.

10. An image pickup apparatus according to claim 9, wherein said releasing means produces a characteristic signal when said level reaches said adequate value.

11. An image pickup apparatus according to claim 10, wherein said inhibiting means inhibits said display monitor from displaying said image corresponding to said electrical signal till said characteristic signal is produced by said releasing means.

12. An image pickup apparatus according to claim 6 wherein said inhibiting means does not operate to inhibit said display monitor from displaying said image once said predetermined amount is provided, even if said amount thereafter becomes less than said predetermined amount.

13. An image pickup apparatus comprising:
   a) photographic optical means for forming an optical image on a radiation sensitive element;
   b) means for converting said image into an electrical signal; and
   c) finder for forming said image on said converting means, said finder optical means being a pan-focusing optical system.

14. An image pickup apparatus according to claim 13, wherein said converting means includes a solid-state image sensing device.

15. An image pickup apparatus according to claim 13, wherein said photographic optical means and said finder optical means are independent from each other.

16. An image pickup apparatus according to claim 13, further comprising:
   d) a display monitor for displaying an image based on said electrical signal.

17. An image pickup apparatus according to claim 16, further comprising:
   e) a housing containing said display monitor, said photographic optical means, said finder optical means and said converting means.

18. An image pickup apparatus according to claim 13, wherein said photographic optical means is a focus-controllable optical system.

19. An image pickup apparatus according to claim 18, further comprising:
   means for controlling a focus of said photographic optical means so that said first optical means can form an image of said image on said radiation sensitive element.

20. An image pickup apparatus according to claim 13, wherein said radiation sensitive element is a silver-halide film.

21. An apparatus having a radiation sensitive element, comprising:
   a) photographic optical means for forming an optical image on said radiation sensitive element;
   b) converting means for converting an optical image incident thereon into an electrical signal;
   c) finder optical means for forming an optical image on said converting means, said photographic optical means and said finder optical means each being constituted of components mutually exclusive thereto; and
   d) display means for displaying an image based on said electrical signal.

22. An apparatus according to claim 21, wherein said photographic optical means is a focus-controllable optical system.

23. An apparatus according to claim 21, wherein said finder optical means is a pan-focusing optical system.

24. An apparatus according to claim 22, further comprising:
   means for controlling a focus of said photographic optical means so that said photographic optical means can form an image of said image on said radiation sensitive element.

25. An apparatus according to claim 22, further comprising:
   d) a housing containing said display monitor, said photographic optical means and said finder optical means.

26. An image pickup apparatus operatable by an operator, comprising:
   a) means for converting an optical image into an electrical signal;
   b) a monitor for displaying said optical image as a visible image corresponding to said electrical signal;
   c) trigger means for producing a first trigger signal in response to a first operation by the operator;
   d) means for controlling said monitor in response to said first trigger signal, said controlling means holding a display on said monitor only for a predetermined period of time after said first trigger signal has been produced; and e) means for setting said predetermined period of time in response to said first trigger signal.

27. An image pickup apparatus according to claim 26, wherein said controlling means disables said monitor to provide any display after having held said display on said monitor for said predetermined period of time.

28. An image pickup apparatus according to claim 26, further comprising:
f) means for supplying an electric power to said monitor.

29. An image pickup apparatus according to claim 26, further comprising:
f) means for storing said electrical signal corresponding to a still image of said optical image, wherein said controlling means permits said monitor to display said electrical signal corresponding to said still image stored in said storing means, only for a predetermined period of time in response to said first trigger signal.

30. An image pickup apparatus operatable by an operator, comprising:

a) means for converting an optical image into an electrical signal;
b) a monitor for displaying said optical image as a visible image corresponding to said electrical signal;
c) trigger means for producing a first trigger signal in response to an operation performed by the operator;
d) means for driving said converting means in response to said first trigger signal, said driving means changing a driven state of said converting means after a predetermined period of time from when said first trigger signal has been produced and including means for setting said predetermined period of time in response to said trigger signal.

31. An image pickup apparatus according to claim 30, wherein said driving means stops an operation of said converting means after said predetermined period of time.

32. An image pickup apparatus according to claim 30, wherein said converting means includes a solid-state image sensing device.

* * * * *

UNITED STATES PATENT AND TRADEMARK OFFICE
CERTIFICATE OF CORRECTION

PATENT NO. : 5,172,151

DATED : December 15, 1992

INVENTOR(S) : Shinya Yomogizawa, et al.

It is certified that error appears in the above-identified patent and that said Letters Patent is hereby corrected as shown below:

TITLE PAGE:

| | |
|---|---|
| Item [75] | Change "Nami" to -- Namai -- |
| Col. 1, line 18 | After "used" insert -- so -- |
| Col. 1, lines 52,56 | Change "of confirming" to -- confirming of -- |
| Col. 2, lines 23-24 | Change "clearness" to -- clarity -- |
| Col. 3, line 23 | After "where" insert -- there -- |
| Col. 3, line 58 | After "permit" insert -- supply of -- |
| Col. 3, line 64 | Change "same numbered" to -- numbered the same -- |
| Col. 4, line 23 | Change "a" to -- an -- |
| Col. 5, line 5 | After "value" insert -- , -- |
| Col. 6, lines 61,63 | Change "1" to -- $\ell$ -- |
| Col. 11, line 55 | Change "an" to -- a -- |
| Col. 12, line 2 | Change "consistent" to -- convenient -- |
| Col. 12, line 13 | After "as" insert -- a -- |
| Col. 12, line 31 | Delete -- the -- |
| Col. 12, line 40 | Change "clearness" to -- clarity -- |
| Col. 13, line 63 | After "finder" insert -- optical means -- |

UNITED STATES PATENT AND TRADEMARK OFFICE
CERTIFICATE OF CORRECTION

PATENT NO. : 5,172,151
DATED : December 15, 1992
INVENTOR(S) : Shinya Yomogizawa, et al.

It is certified that error appears in the above-identified patent and that said Letters Patent is hereby corrected as shown below:

Col. 14, line 50     Change "22" to -- 21 --

Signed and Sealed this

Twenty-third Day of November, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,172,151
DATED : December 15, 1992
INVENTOR(S) : Shinya Yomogizawa, et. al.

It is certified that error appears in the above-indentified patent and that said Letters Patent is hereby corrected as shown below:

On the Title page,
    item [30]. Foreign Application Priority Data April 15, 1986[JP] Japan.....61-086821 -- item [30]. Foreign Application Priority Data April 15, 1986[JP] Japan.....61-086822 -- item [30]. Foreign Application Priority Data April 15, 1986[JP] Japan.....61-086823 --

ITEM [63]. Change "April 19, 1990" to -- April 12, 1990 --

Signed and Sealed this

Twenty-first Day of December, 1993

Attest:

BRUCE LEHMAN

Attesting Officer     Commissioner of Patents and Trademarks